(12) United States Patent
Pan et al.

(10) Patent No.: US 7,392,466 B2
(45) Date of Patent: Jun. 24, 2008

(54) METHOD AND SYSTEM OF ANNOTATION FOR ELECTRONIC DOCUMENTS

(75) Inventors: Yue Pan, Beijing (CN); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 10/904,072

(22) Filed: Oct. 21, 2004

(65) Prior Publication Data

US 2005/0132281 A1 Jun. 16, 2005

(30) Foreign Application Priority Data

Oct. 21, 2003 (CN) ................... 2003 1 0101726

(51) Int. Cl.
*G06F 17/00* (2006.01)
*G06F 17/20* (2006.01)
(52) U.S. Cl. ...................................................... 715/200
(58) Field of Classification Search ................ 715/500, 715/512, 513, 200
See application file for complete search history.

(56) References Cited

U.S. PATENT DOCUMENTS

| | | | |
|---|---|---|---|
| 5,146,552 A | 9/1992 | Cassorla et al. | |
| 6,081,829 A | 6/2000 | Sidana | |
| 6,218,635 B1 | 4/2001 | Shigemoto et al. | |
| 6,237,001 B1 * | 5/2001 | Bamford et al. | 707/100 |
| 6,598,059 B1 * | 7/2003 | Vasudevan et al. | 707/203 |
| 6,631,386 B1 * | 10/2003 | Arun et al. | 707/203 |
| 6,687,878 B1 * | 2/2004 | Eintracht et al. | 715/512 |
| 2002/0095447 A1 | 7/2002 | Weber et al. | |
| 2002/0178007 A1 | 11/2002 | Slotznick et al. | |
| 2003/0018670 A1 | 1/2003 | Ashford et al. | |
| 2003/0196164 A1 * | 10/2003 | Gupta et al. | 715/500.1 |
| 2004/0261016 A1 * | 12/2004 | Glass et al. | 715/512 |
| 2005/0166146 A1 * | 7/2005 | Silverbrook et al. | 715/530 |

FOREIGN PATENT DOCUMENTS

| | | |
|---|---|---|
| JP | 2001-331496 | 11/2001 |
| WO | WO-0221306 A3 | 2/2002 |
| WO | WO-0221306 A2 | 3/2002 |

OTHER PUBLICATIONS

Cadiz et al."Using Web Annotations For Asynchronous Collabration Around Documents". ACM, 2000, pp. 309-318.*
Kahan et al.,"Annotea: An Open RDF Infrastructure for Shared Web Annotations",ACM, May 2001, pp. 623-632.*
Sciore, Edward,:Using Annotations to Support Multipile kinds of Versioning in an Object-Oriented Database System, ACM, 1991, pp. 417-438.*

* cited by examiner

*Primary Examiner*—Doug Hutton
*Assistant Examiner*—James J Debrow
(74) *Attorney, Agent, or Firm*—Mark C. McCabe; Marc D. McSwain; Leonard T. Guzman

(57) ABSTRACT

The present invention provides a method of annotation for electronic document, a method for creating, modifying and browsing an annotation in an electronic document, and an apparatus and system for editing, browsing annotations in electronic document. The method of annotation for electronic document includes: storing annotation contents for one or more electronic documents into a shared dictionary; and when a reader browses an electronic document, providing the reader with annotations for the electronic document based on the shared dictionary.

7 Claims, 7 Drawing Sheets

METHOD AND SYSTEM OF ANNOTATION FOR ELECTRONIC DOCUMENTS

The present invention relates to data processing technology, and more particularly relates to method, apparatus and system of annotation for electronic document.

BACKGROUND

Annotations have been widely used in conventional articles, books and publications to provide interpretations (or comments) to the abbreviations, terms, concepts and persons contained in the articles, books and publications, to provide semantic information so that the readers can better understand the authors' thoughts and avoid ambiguities.

Since recent years, with the continuous development of the computer technology and network technology, more and more electronic publications have gradually constituted the way in which people read and browse to acquire knowledge. In the digitized electronic documents processing field, the applications of annotations have been further developed, and various contents and forms of annotations have occurred. Especially, with the popularization of markup languages such as HTML, XML etc. on the Internet, the annotations for electronic documents are no longer limited to the textual interpretations to abbreviations and terms, but also include: the web pages (of companies or individuals) containing related contents, network links such as hypertext links, and multimedia information etc.

For example, U.S. Pat. No. 5,146,552 entitled "Method For Associating Annotation With Electronically Published Material" by Elie Cassorla et al., disclosed a method for annotating online electronic book and a method for creating annotations and bookmarks in an electronic book, the contents of which are incorporated herein for reference in its entirety.

In electronic document annotation techniques of the prior art, no matter whether in the mode that annotation contents are embedded in an electronic document or in the mode that annotation contents are separated with an electronic document, the electronic document and the annotation contents thereof are recorded and stored in one to one correspondence, and both are delivered to readers for browsing. Consequently, there arises the problem that the same annotation contents are recorded and transmitted repetitively (redundantly) due to its occurring in multiple documents or even at multiple locations in the same document.

SUMMERY OF THE INVENTION

To solve the above mentioned problems in the prior art, according to one aspect of the invention, it is provided a method of annotation for electronic document comprising: saving the annotation contents for one or more electronic documents in a shared dictionary; and when a reader browses the electronic document, providing the annotations for the electronic document to the reader based on the shared dictionary.

According to another aspect of the invention, it is provided a method for creating an annotation in an electronic document comprising: selecting a portion to be annotated in the document; looking up a corresponding annotation content in a shared dictionary which contains annotation contents for one or more electronic documents; and associating the portion to be annotated in the electronic document with the corresponding annotation content in the shared dictionary.

According to still another aspect of the invention, it is provided a method for creating an annotation in an electronic document comprising: selecting a portion to be annotated in the electronic document; looking up a corresponding annotation content in a shared dictionary which contains annotation contents for one or more electronic documents; and if the corresponding annotation contents is not found in the shared dictionary, adding an entry into the shared dictionary to record the annotation content.

According to still another aspect of the invention, it is provided a method for modifying an annotation in an electronic document comprising: selecting an annotated portion to be modified in the document; looking up a corresponding annotation content in a shared dictionary which contains annotation contents for one or more electronic documents; and modifying the corresponding annotation content in the shared dictionary.

According to still another aspect of the invention, it is provided a method for modifying an annotation in an electronic document comprising: looking up an annotation content to be modified in a shared dictionary which contains annotation contents for one or more electronic documents; and modifying the annotation content in the shared dictionary, and thereby changing the corresponding annotation content in the one or more electronic documents.

According to still another aspect of the invention, it is provided a method for browsing an annotations in an electronic document, wherein annotation contents for one or more electronic documents are saved in a shared dictionary, the method comprising: selecting an annotated portion in the electronic document; looking up an annotation content corresponding to the annotated portion in the shared dictionary; and displaying the corresponding annotation content in the shared dictionary.

According to still another aspect of the invention, it is provided an apparatus for editing annotations in an electronic document, comprising: an electronic document editor for browsing and editing an electronic document, and selecting a portion to be annotated in the electronic document; a dictionary lookup unit for looking up an annotation content corresponding to the portion to be annotated in a shared dictionary which contains annotation contents for one or more electronic documents; and a dictionary editor for adding and modifying the annotation contents in the shared dictionary.

According to still another aspect of the invention, it is provided an apparatus for browsing annotations in an electronic document, comprising: an electronic document browser for browsing an electronic document, and selecting an annotated portion in the electronic document; and a dictionary lookup unit for looking up an annotation content corresponding to the annotated portion in a shared dictionary which contains annotation contents for one or more electronic documents; wherein the annotation content corresponding to the annotated portion, after being found by the dictionary lookup unit, are displayed by the electronic document browser.

According to still another aspect of the invention, it is provided a system of annotation for electronic documents, comprising: the above-described apparatus for editing annotations in an electronic document; the above-described apparatus for browsing annotations in an electronic document; and a shared server for storing the shared dictionary and providing access to the shared dictionary

DETAILED DESCRIPTION OF THE INVENTION

Figure 1:
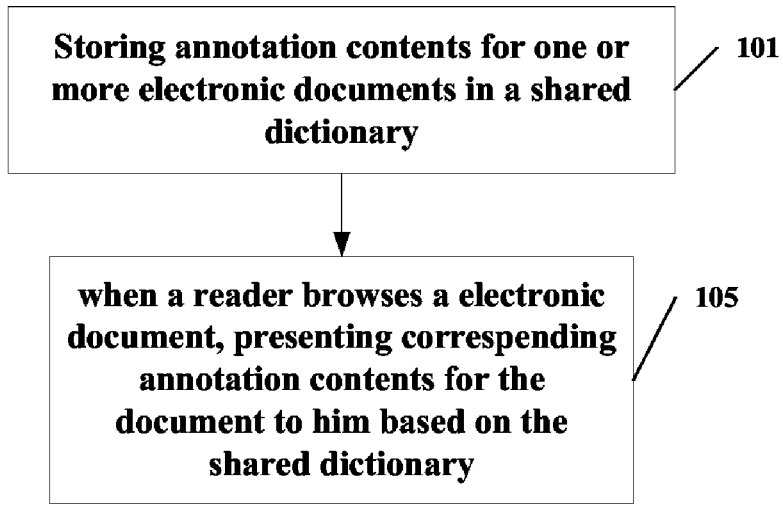
FIG. 1 is a flowchart illustrating a method of annotation for electronic document according to another embodiment of the invention.

FIG. 1 is a flowchart illustrating a method of annotation for electronic document according to an embodiment of the present invention. The method of annotation for electronic document comprises, as shown in FIG. 1, first storing annotation contents for one or more electronic documents in a shared dictionary at step 101. Particularly, each of the annotation contents is recorded as an entry in the shared dictionary; and the shared dictionary is stored on, for example, a shared server, so that it can be accessed by a plurality of computers of the readers who are browsing the electronic documents. Table 1 below shows an exemplarily part of the contents contained in a shared dictionary. It can be seen from the table 1 that according to this embodiment, each entry in the shared dictionary includes: an entry ID, an annotated portion and an annotation content, wherein "entry ID" is an ID code uniquely identifying an entry; "annotated portion" is used to record a portion of the electronic document that is desired to be annotated such as a name, a term or an abbreviation; and in "annotation content" is used to record the annotation content that corresponds to the annotated portion and to be provided to the readers. The annotation content, apart from text descriptions, may also include a URL or other forms of links for pointing to other sources containing the related contents.

TABLE 1

Example of the content in a shared dictionary

| Entry ID | Annotated portion | Annotation Contents |
|---|---|---|
| 0001 | HTML | Hyper Text Markup Language |
| 0002 | Java | http://java.sun.com/ |
| 0003 | Linux | An open source UNIX-like operating system, originally begun by Linus Torvalds. |

Then at step 105, when a reader browses the electronic document via a computer, the corresponding annotation content in the electronic document is provided to the reader based on the shared dictionary. Particularly, when the reader browses the electronic document, in response to the reader's annotation operation, such as, for example, selecting a portion whose annotation is desired to be seen (an annotated portion) and then clicking (or double-clicking) it with a mouse etc., the corresponding annotated portion and annotation content are looked up in the shared dictionary, and the annotation content is provided to the reader.

In this embodiment, the format of the electronic document has no special limitation, and can be a document in markup language format, such as HTML, XML etc., or other format such as plain text format etc. Moreover, the shared dictionary is not limited to the example in table 1; it can also include other contents. The shared server for storing the shared dictionary can be a personal computer, a PC server, a mainframe or server cluster etc, as long as it can provide access service to a computer used by a reader of an electronic document. In addition, reader's annotation operations can also employ other forms, such as, selecting an annotated portion and then placing the mouse on it (mouse over), or selecting a menu option etc.

According to this embodiment, because the annotation contents for one or more electronic documents are stored in a shared dictionary, the annotation contents that appear more than once in electronic documents need not to be recorded and transmitted repetitively, thereby saving a great deal of storage and bandwidth resources.

In addition, according to a variation of this embodiment, when a reader browses an electronic document, the content of the electronic document is matched and identified first based on the information of the annotated portions contained in the shared dictionary, and the identified annotated contents (portions) are indicated distinctively, for example, by way of highlighting or changing font etc. Thus, when the reader performs annotation operations, he/she can see clearly the annotated portions containing annotation contents, and moreover he/she does not need to select precisely an annotated portion, but only clicking or placing the mouse in the range of the annotated portion.

Furthermore, according to another variation of this embodiment, the electronic document contains tags that associate the annotated portions in the electronic document with the annotation contents in a shared dictionary. Each of these tags includes at least a corresponding entry IDs. For an electronic document in markup language format, such tags can be embedded in the electronic document as a mark; for an electronic document in other formats, the tags can be combined with the electronic document as a part or can be saved separately, in which case the tag should include the position (absolute position or relative position) of the annotated portion in the electronic document and the corresponding entry ID in the shared dictionary. Thus, when a reader browses an electronic document, first the annotated portions in the electronic document can be highlighted according to these tags, and when the reader performs annotation operations, he/she does not need to select precisely an annotated portion, but only clicking or placing the mouse in the range of the annotated portion.

Figure 3:
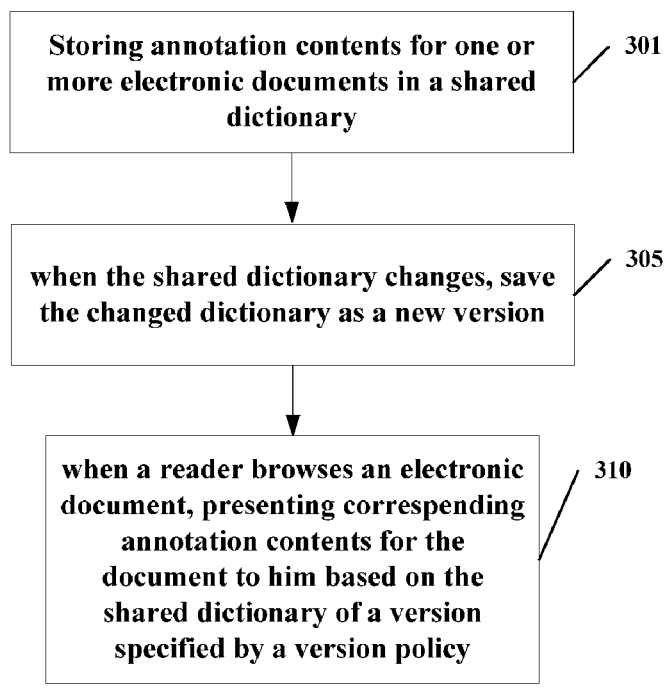
FIG. 3 is a flowchart illustrating a method of annotation for electronic documents according to an embodiment of the invention.

FIG. 3 is a flowchart illustrating a method of annotation for electronic document according to another embodiment of the present invention. As shown in FIG. 3, first, like step 101 in the previous embodiment, at step 301 annotation contents for one or more electronic documents are saved in a shared dictionary. Next, at step 305, when the content of the shared dictionary changes, the changed shared dictionary will be saved as a new version.

With the elapse of time, the progress of science and technology and the development of society, the interpretation for the same name, term or concept may vary, and as a result the meaning understood by a reader may differ from what the author intended to express during writing. To avoid the occurrence of such a situation, in this embodiment, when the content of the shared dictionary changes, the shared dictionary won't be overwritten, the changed shared dictionary will be saved as a new version. Therefore, annotation contents at different periods of time are saved in a plurality of versions of the shared dictionary.

Accordingly, an electronic document contains version requirement for specifying the version of the shared dictionary used by the electronic document. According to this embodiment, version requirement for shared dictionary includes: "restrict", "non restrict", "above" and "latest", wherein "restrict version" means that the shared dictionary is limited to only a certain version, for example, being limited to version No. 1001 only; "non restrict version" means the shared dictionary can use any version; "above version" means that the shared dictionary is limited to use above a certain version, for example, above version No. 1001; "latest version" means only the shared dictionary of the latest version on the shared server can be used. According to this embodiment, an annotation policy is recorded in the header section of an electronic document, it is not limited to that, the annotation policy can also be recorded in other section of an electronic document.

Next, at step 310, when a reader browses an electronic document, based on the shared dictionary, whose version is specified by the annotation policy, corresponding annotation contents are provided to the reader. Particularly, when the reader browses the electronic document, first the annotation policy in the electronic document is retrieved (for example, from the header), and in response to the reader's annotation operations, the corresponding annotation contents in the shared dictionary, whose version is specified by the annotation policy, are provided to the reader, wherein the reader's annotation operations are essentially the same as the specific implementations of the above embodiments, and the repetitive description is omitted here for brevity.

According to this embodiment, because the electronic dictionary that changed at different periods of time has been saved as different versions, and when a reader browses an electronic document, the corresponding annotation contents are provided to the reader based on the shared dictionary of the version specified by annotation policy, the occurrence of misunderstanding (misinterpreting) in annotation contents due to incessant changes made to the shared dictionary at different periods of time can be avoided. In another aspect, by selectively setting four kinds of annotation policy, the flexibility in updating the annotation contents can be achieved.

In addition, according to a variation of this embodiment, one electronic document can relate to multiple shared dictionaries, that is, the annotation contents corresponding to the annotated portions in the electronic document are saved in more than one shared dictionaries which contain different annotation contents respectively, and the annotation policies are set according to these shared dictionaries respectively. An electronic document may contain various types of annotation, such as, for example, interpretations to general terms, interpretations to specialized terms and concepts, introductions to the backgrounds of persons, introductions to the details of companies, network links (e.g. URLs), address book information etc. For these different types of annotation contents, the update requirements are different; additionally, from the point view of management and performance it would also be advantageous to classify and store the annotation contents into multiple shared dictionaries. Therefore, in this variation of the embodiment, the shared dictionaries are classified as: general term dictionary (ID: 001), a plurality of specialized term dictionaries (e.g. in different fields such as computer, chemistry, biology, history etc., ID: 002-004, and of course they can also be further classified), a network link dictionary (ID: 005), a people and company name dictionaries (ID: 006), an address book dictionary (ID: 007). Of course, the classification of shared dictionaries can be adapted to different fields and application environments, and the classification of this variation of embodiment is only for purpose of exemplary description.

Furthermore, in this variation of the embodiment, for a single electronic document, annotation policy is also setup according to different shared dictionaries. In table 2 below the shared dictionaries and annotation policy thereof, involved in a scientific document in computer field, are shown examplarily.

TABLE 2

Example of annotation policies of an electronic document

| Dictionary ID | Annotation policy |
|---|---|
| 001 | restrict version, 1001 |
| 002 | restrict version, 1021 |
| 006 | above version, 1011 |
| 007 | latest version |

From the example shown in table 2, it can be seen that an electronic document may relate to a combination of different shared dictionaries. The electronic document shown in table 2 relates to a general term dictionary (ID: 001), a computer field term dictionary (ID: 002), a people and company name dictionary (ID: 006), an address book dictionary (ID: 007). The annotation policy for the general term dictionary (ID: 001) and the computer field term dictionary (ID: 002) is "restrict version, 1001" and "restrict version 1021" respectively, and thus, even if the semantic of a certain term or phrase changes, a reader is still ensured to be able to see the original meaning used by the author, and thus to be able to understand correctly. The annotation policy for the people and company name dictionaries (ID: 006) is "above version, 1011", because the people and company name dictionary of version 1011 and above has all people and company names involved in the electronic document. The annotation policy for the address book dictionary (ID: 007) is "latest version", because in order for the reader to be able use the address book's formation obtained, it is necessary to provide the reader with the latest address book's information.

From the above example it can be seen that the present variation of the embodiment takes into consideration both the update of annotations and the consistency in semantic at the same time and enhances the performance in lookup due to the decrease of data amount in individual dictionaries, by classifying and storing annotation contents of different types into multiple dictionaries, and setting annotation policies according to these shared dictionaries respectively.

In addition, according to another variation of the embodiment, a series of multiple versions of a shared dictionary are saved in incremental manner on a shared server, and before providing annotations to the reader, the shared dictionary of the version specified by the annotation policy is restored locally. Particularly, the whole content of the original version and the differential contents (incremental) of the subsequent versions of the shared dictionary are saved on the shared server, and in this way a large amount of repetitive data can be eliminated, thereby saving the storage space. Accordingly, before providing annotations to the reader, the shared dictionary should be restored up to the specified version on the reader's computer, and in this way proper annotations could be provided.

Furthermore, the above two variations of the present embodiment can also be combined together, that is, multiple serial versions of multiple dictionaries are saved in incremental manner on a shared server, and before providing annotations to the reader, the related shared dictionaries will be restored locally up to the specified versions respectively according to the annotation policies.

The features of the variation of the embodiment shown in FIG. 1 also can be applied to the present embodiment. For example, an electronic document can contain tags that associate the annotated portions in the electronic document with the annotation contents in a shared dictionary. When an electronic document relates to a plurality of shared dictionaries, the tags, apart from the corresponding entry IDs, should also contain dictionary IDs. Moreover, these tags can also contain version requirements, thereby even allowing setting annotation policy for each annotated portion respectively in the electronic document.

Figure 4:
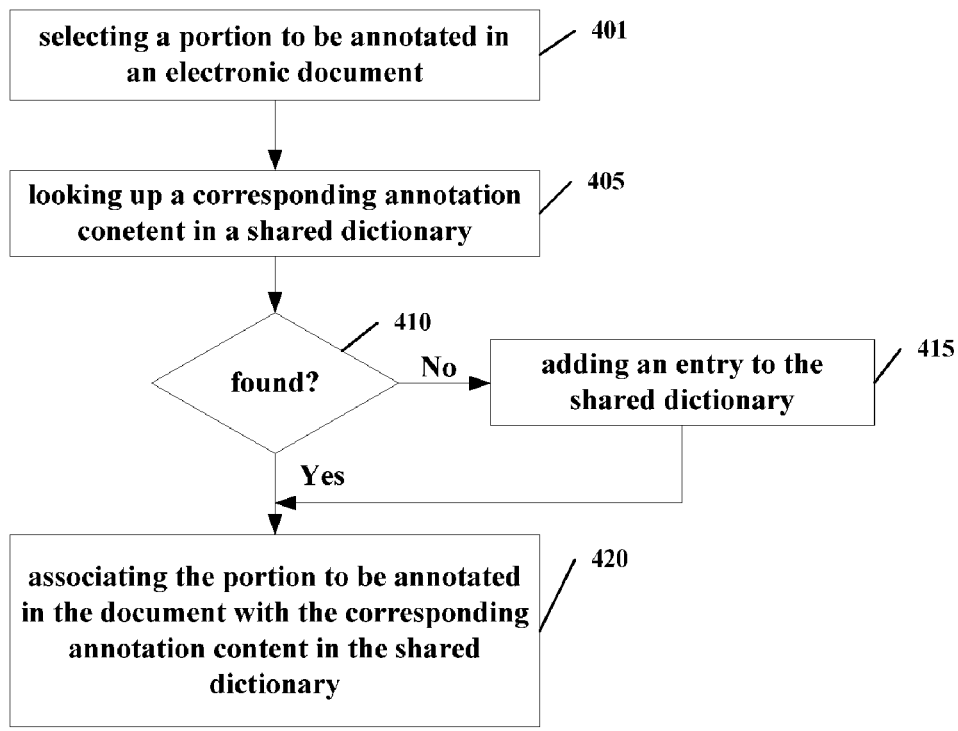
FIG. 4 is a flowchart illustrating a method for creating an annotation in an electronic document according to an embodiment of the invention.

Under the same inventive concept, FIG. 4 is a flowchart illustrating a method of creating an annotation in an electronic document according to an embodiment of the present invention. As shown in FIG. 4, first a portion to be annotated in the electronic document is selected at step 401. When composing or editing an electronic document, if the author (or other editing persons) wants to create an annotation in the electronic document, he/she should first use a mouse or other input device to select, in the electronic document, a portion to be annotated, where he/she wants to provide an annotation.

Next, at step 405, the corresponding annotation content is looked up in a shared dictionary. When the author selects a portion to be annotated, the computer system will automatically look up in the shared dictionary to see whether the portion is recorded in the shared dictionary. And at step 410 a determination is made, if the corresponding annotation is found, the process proceeds to step 420 where the portion to be annotated in the electronic document is associated with the corresponding annotation content in the shared dictionary. In this embodiment, it is accomplished by adding a tag into the electronic document to associate the annotated portion with the corresponding annotation content in the shared dictionary. Since tags have been described above, they will not be described repeatedly here.

If it is determined at step 410 that the corresponding annotation is not found, the process proceeds to step 415 where an entry is added into the shared dictionary. In the field of annotated portion of the added entry the portion to be annotated selected at previous step 401 will be recorded, while the corresponding annotation content will be inputted by the author and saved in the field of annotation content of the added entry. Then, the process proceeds to step 420 where the annotated portion is associated with the newly added corresponding annotation content in the shared dictionary.

The method for creating an annotation in an electronic document according to this embodiment can be implemented during the author's composing process. For example, each time the author inputs a sentence (e.g. input ".", "?"), first the sentence is parsed automatically to identify every nouns and terms and accordingly displaying them distinctively. Next, the method of this embodiment is performed to create annotations.

Similarly, the method for creating an annotation in an electronic document can also be implemented in the editing processing of the electronic document. For example, first, the whole electronic document is parsed automatically to identify every nouns and terms and accordingly displaying them distinctively. Next, the method of this embodiment is performed repeatedly to create annotations until the whole electronic document has been processed.

In addition, according to a variation of this embodiment, step 420 is omitted, that is, during the process of creating an annotation, the annotated portion is not associated with the newly added corresponding annotation content in the shared dictionary. And accordingly, when a reader browses annotations, it is necessary to match and recognize the annotated portions in the electronic document according to the annotated portions recorded in the shared dictionary, or it is needed that the reader selects precisely an annotated portion, as described in the previous embodiment.

Figure 5:
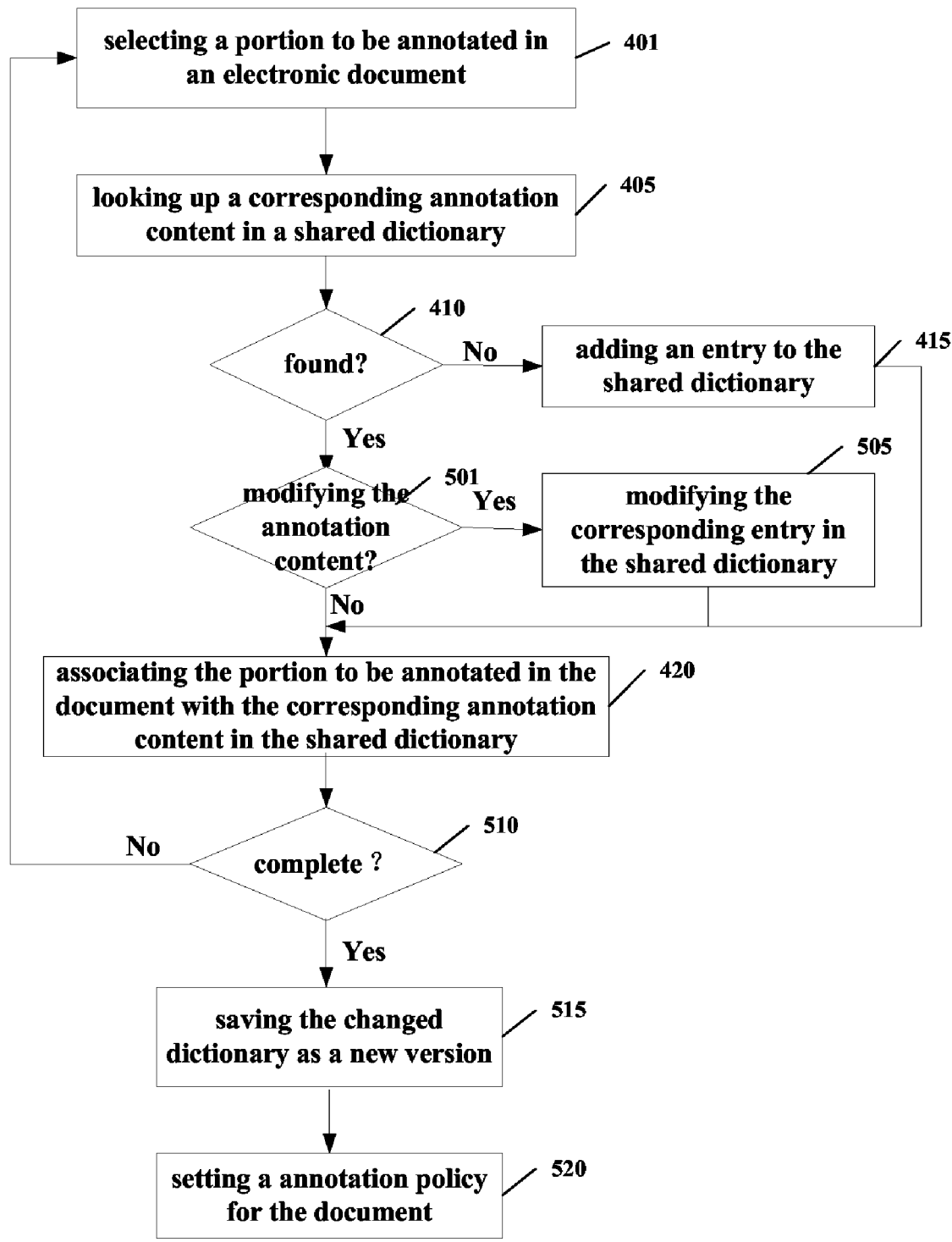
FIG. 5 is a flowchart illustrating a method for creating an annotation in an electronic document according to another embodiment of the invention.

FIG. 5 is a flowchart illustrating the method for creating an annotation in an electronic document according to another embodiment of the invention. For brevity, the steps In FIG. 5 that are the same as those in FIG. 4 are marked with same numbers, and repetitive descriptions are omitted here appropriately.

As shown in FIG. 5, first, at step 401 a portion to be annotated is selected in the electronic document. Then at step 405 the corresponding annotation content is looked up in the shared dictionary. At step 410, a determination is made on whether the corresponding annotation content is found in the shared dictionary. If the determination is "No", the process proceeds to step 415 where an entry is added to the shared dictionary and the annotation content is input, and then the process proceeds to step 420 where the annotated portion in the electronic document is associated with the corresponding annotation content in the shared dictionary. If the determination at step 410 is "Yes", then the process proceeds to step 501 where the corresponding annotation content found is provided to the author, and a determination is made as to whether the author will modify this annotation content. If not, the process proceeds directly to step 420, and if the author makes modification, then step 505 is performed to save the annotation content modified by the author into the corresponding entry in the shared dictionary, and then go to step 420.

Next, at step 510, a determination is made on whether all annotations have been made, if the determination is "NO", then the process returns to step 401 to repeat the previous processing, if the determination is "Yes", then the process proceeds to step 515 to save the changed shared dictionary as a new version. Next, the annotation policy of the electronic document is set at step 520. The versions of a shared dictionary and the annotation policy have been described above, and will not be repeated here.

The method of this embodiment can similarly be implemented either during an author's composing phase, or during the editing phase of an electronic document. And preferably, after at least one electronic document is processed, the shared dictionary modified is saved as a new version, thus reducing the number of versions of the shared dictionary as many as possible.

In addition, according to a variation of this embodiment, an electronic document relates to a plurality of shared dictionaries. The differences of this variation of the embodiment are: at step 415, when adding an entry into the shared dictionary, first allowing the author to choose which shared dictionary to add to; at step 515, each of the shared dictionaries that have been changed is saved as a new version respectively; at step 520, the annotation policy are set for the shared dictionaries respectively. And moreover, if tags are used to associate the annotated portions in an electronic document with the corresponding annotation contents in the shared dictionaries, the tags should also contain dictionary IDs.

Figure 6:
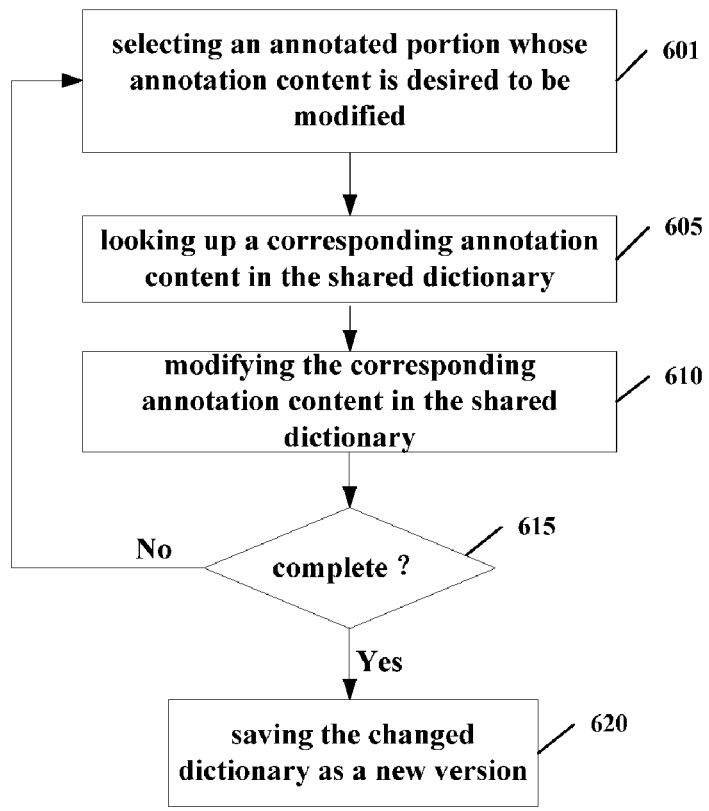
FIG. 6 is a flowchart illustrating a method for modifying an annotation in an electronic document according to an embodiment of the invention.

Under the same inventive concept, FIG. 6 is a flowchart illustrating a method for modifying an annotation in an electronic document. As shown in FIG. 6, first an annotated portion whose annotation is to be modified is selected in the electronic document at step 601. Then, the corresponding annotation content is looked up in the shared dictionary at step 605; the author or an editing person modifies the corresponding annotation content in the shared dictionary at step 610. Then, at step 615, a determination is made on whether all modifications have been made, and if the determination is "No", then the process returns to step 601 to repeat the above processing; if the determination is "Yes", then the process proceeds to step 620 to save the changed shared dictionary as a new version.

The method for modifying an annotation according to this embodiment can be implemented during the phase of author composing or editing an electronic document. For example, after an author input a part or whole content of an electronic document and created some annotations, the author may modify these annotations one by one through performing the method of this embodiment.

According to a variation of this embodiment, the shared dictionary that has been modified is not saved as a new version, but directly save the annotation contents that have been modified into the corresponding entries in the shared dictionary. Thus, step 615 and step 620 can be omitted.

Alternatively, in this embodiment, a plurality of serial versions of a shared dictionary can also be saved in incremental manner on a shared server.

Furthermore, according to another embodiment of the invention, instead of selecting an annotated portion in an electronic document first and modifying the annotation content next, the author or an editing person can directly open the shared dictionary, looks up an annotation content to be modified in the shared dictionary and modify it, result in changing the annotation of one or more associated electronic documents.

Alternatively, in this embodiment, the shared dictionary that has been modified can be saved as a new version, and furthermore, a plurality of serial versions of the shared dictionary can be saved in incremental manner on a shared server.

Figure 7:
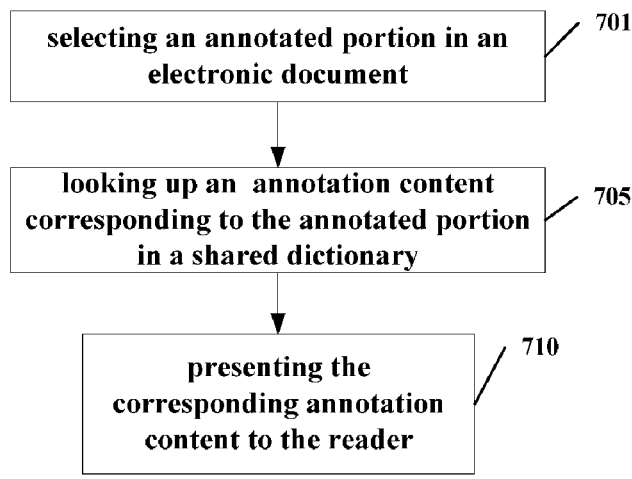
FIG. 7 is a flowchart illustrating a method for browsing an annotation in an electronic document according to an embodiment of the invention.

Under the same inventive concept, FIG. 7 is a flowchart illustrating a method for browsing an annotation in an electronic document according to an embodiment of the present invention. As shown in FIG. 7, first an annotated portion is selected in the electronic document at step 701; then the annotation content corresponding to the annotated portion is looked up in a shared dictionary at step 705; and the corresponding annotation content is displayed to the reader at step 710.

Alternatively, according to a variation of this embodiment, before the reader selects an annotated portion, the content of the electronic document can first be matched and recognized based on the information of the annotated portions contained in the shared dictionary, and the recognized annotated portions can be displayed distinctively by way of, for example, highlighting or changing the font. Thereby, when the reader selects an annotated portion, he/she can see clearly the annotated portions that contain annotations, and he/she need not select precisely an annotated portion, but only need to click or place the mouse in the range of the annotated portion.

Alternatively, according to another variation of this embodiment, an electronic document contains tags that associate the annotated portions in the electronic document with the annotation contents in a shared dictionary. Before the reader selects an annotated portion, the annotated portions in the electronic documents can be displayed distinctively according to these tags, and when the reader selects an annotated portion, he/she need not select precisely an annotated portion, but only need to click or place the mouse in the range of the annotated portion.

Figure 8:
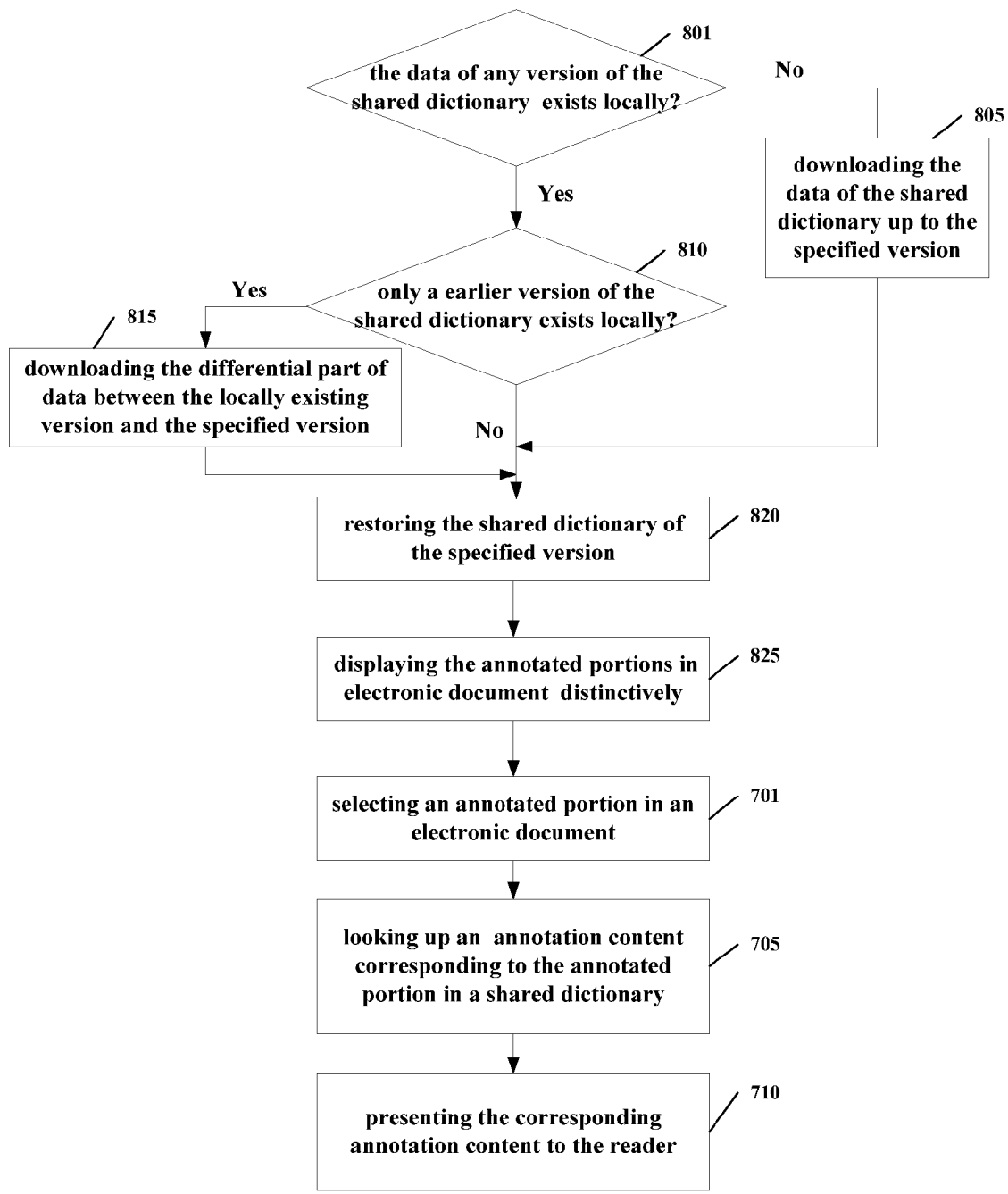
FIG. 8 is a flowchart illustrating a method for browsing an annotation in an electronic document according to another embodiment of the invention.

FIG. 8 is a flowchart illustrating a method for browsing an annotation in an electronic document according to another embodiment of the invention, wherein the steps in this embodiment, which are same as those in the embodiment shown in FIG. 7, are marked with same numbers, and their descriptions are omitted appropriately.

The method for browsing an annotation in an electronic document according to this embodiment applies to the following situation: a shared dictionary has multiple versions, the multiple serial versions of the shared dictionary are saved in incremental manner on a shared server, and the electronic document contains an annotation policy that specifies the version of the shared dictionary, for example, the annotation policy may indicate "restrict version: 1010". The versions of a shared dictionary and the annotation policy have been described above and will not be repeated here.

As shown in FIG. 8, first at step 801, a determination is made on whether the data of any version of the shared dictionary used by the electronic document exists locally, and if the determination is "No", then step 805 will be performed to download the data of the shared dictionary up to the specified version, that is, download the original (first) version entirely and the differential parts up to the specified version of the shared dictionary to the reader's computer; and then at step 820, the shared dictionary of the version specified by the annotation policy is restored on the reader's computer.

If the determination at step 801 is "Yes", then the process proceeds to step 810 where a determination is made on whether the locally existing data of the shared dictionary is earlier (previous) than the version specified by the annotation policy, and if the determination is "Yes" (e.g. the data of version 1005 exists locally), step 815 is performed to download the differential part of data between the locally existing version and the specified version (e.g. from 1005 to 1010); then step 820 is performed to restore the shared dictionary of the specified version based on the existing data and downloaded data locally. If the determination at step 810 is "No", which indicates all the data required by the shared dictionary of the specified version exists locally, step 820 will be directly performed to restore the shared dictionary of the specified version.

Next, at step 825, the annotated portions in electronic document are displayed distinctively (distinctively displaying has been described above and will not be repeated here). And then step 701 to 710 essentially same as those in the previous embodiment are performed.

In addition, if the annotation policy of the electronic document is "non restrict version", step 810 and 815 can be omitted, and at step 805 only the data of the original version of the shared dictionary is necessary to be downloaded; if the annotation policy of the electronic document is "above version", for example, "above version, 1010", then at step 820 the shared dictionary is restored to the version as high as possible according to all the locally existing and downloaded data; if the annotation policy of the electronic document is "latest version", then step 805 should be downloading all the data of the shared dictionary from the original version to the current latest version to local computer, and step 815 should be downloading the differential part of data between the locally existing version and the current latest version.

The method for browsing an annotation in an electronic document according to this embodiment can provide the annotation contents of the specified version according to the annotation policy, and fully take advantage of the multiple versions of the shared dictionary being saved in incremental manner to reduce as much as possible the bandwidth resources for downloading the data.

Alternatively, a variation of this embodiment applies to the situation in which an electronic document relates to a plurality of shared dictionaries and the annotation policy is set for each of the shared dictionary respectively. According to this variation of the embodiment, first, steps 801 to 820 are performed to download and restore multiple dictionaries involved in the electronic document, one by one according to the annotation policy. Then subsequent steps 701 to 710 are performed.

Figure 9:
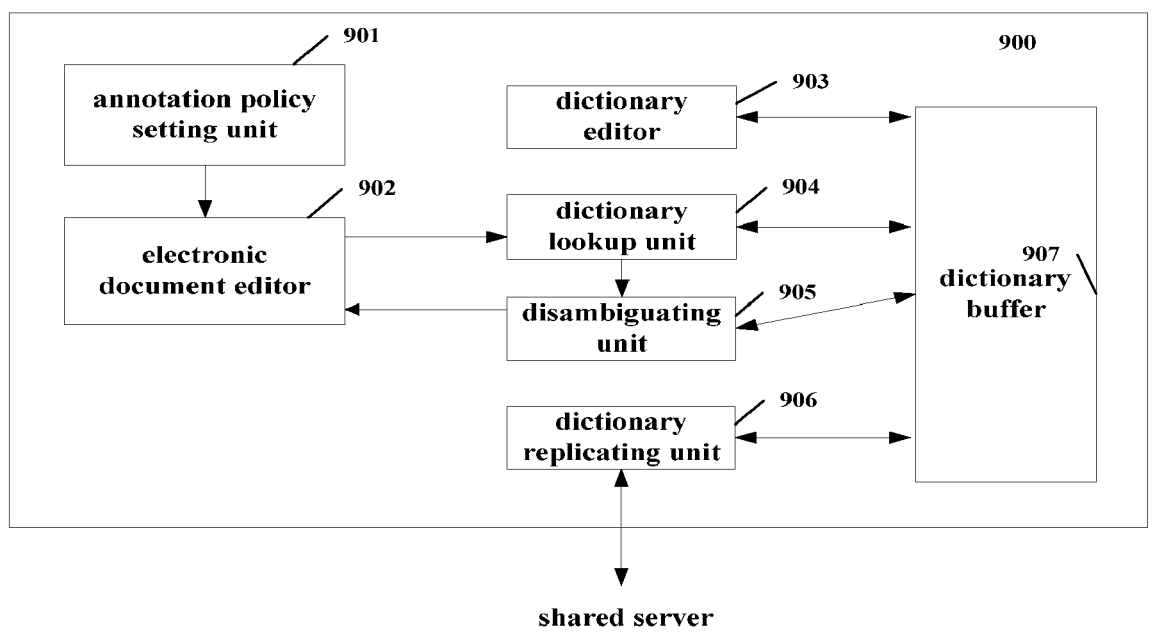
FIG. 9 is a block diagram illustrating an apparatus for editing annotations for an electronic document according to an embodiment of the invention.

Under the same inventive concept, FIG. 9 is a block diagram illustrating an apparatus for editing annotations in an electronic document according to an embodiment of the invention. As shown in FIG. 9, the apparatus 900 for editing annotations in an electronic document of this embodiment includes: a dictionary buffer 907 for saving a shared dictionary locally; an electronic document editor 902 for browsing and editing an electronic document, such as selecting an annotated portion in an electronic document, displaying the annotated portions distinctively etc.; a dictionary lookup unit 904 for looking up the annotation content corresponding to an annotated portion in a shared dictionary; a dictionary editor 903 for browsing, adding and modifying entries (annotation contents) in a shared dictionary; a dictionary replicating unit 906 for replicating a shared dictionary on a shared server to the dictionary buffer 907, or replicating a shared dictionary (newly created or modified) in the dictionary buffer 907 to the shared server; an annotation policy setting unit 901 for setting an annotation policy for an electronic document; a disambiguating unit 905 for selecting one of the annotation contents when the dictionary lookup unit 904 finds more than one corresponding annotation contents.

Through the apparatus 900 for editing annotations in an electronic document according to this embodiment, the methods for creating and modifying an annotation as described in the previous embodiments can be implemented. Particularly, during the process of creating an annotation, after the author (or an editing person) selects a portion to be annotated in the electronic document editor 902, the dictionary lookup unit 904 looks up the corresponding annotation content in the shared dictionary in dictionary buffer 907. If corresponding entry (contain annotation contents) is found, a tag is inserted into the corresponding location in the electronic document by means of electronic document editor 902. If no corresponding entry is found, then through dictionary editor 903, an entry will be added into the shared dictionary in the dictionary buffer 907, and new annotation content is inputted. In addition, when the electronic document relates to a plurality of shared dictionaries, and a plurality of annotation contents (entries) corresponding to the annotated portion are found in multiple shared dictionaries, the disambiguating unit 905 select one of them based on context, technical field or by way of prompting for the author's selection. Then, through the electronic document editor 902, a tag is inserted into the corresponding place in the electronic document.

In the process of modifying an annotation, after the author selects an annotated portion, dictionary lookup unit 904 looks up the corresponding annotation content in the shared dictionary in dictionary buffer 907 by means of the tag. Then, the author can modify the annotation content, and save it into the shared dictionary through dictionary editor 903. In addition, the author can also directly browse and edit the shared dictionary to change the corresponding annotation in a plurality of related electronic documents by means of dictionary editor 903.

After editing annotations in an electronic document (or before or during the editing phase), the author can set an annotation policy for the electronic document and record the annotation policy in the electronic document by means of annotation policy setting unit 901. After editing annotations in one or more electronic documents, one or more shared dictionaries that have been modified or added in the dictionary buffer are replicated to the shared server as a new version through dictionary replicating unit 906.

The apparatus for editing annotations in an electronic document of this embodiment can be used to implement the variations of previous methods, such as, the variations that an electronic document relates to a plurality of shared dictionaries, that a shared dictionary has multiple versions, and that multiple serial versions of a shared dictionary are saved in incremental manner on the shared server.

Because dictionary buffer 907 in this embodiment can be used to store the shared dictionary on the shared server locally, it is not necessary to maintain the connection to the shared server during editing annotations, and because dictionary buffer 907 is local, the performance of looking up and editing has been enhanced.

Alternatively, according to a variation of this embodiment, in an apparatus 900 for editing annotations in an electronic document there is no dictionary buffer 907 and dictionary replicating unit 906. The dictionary lookup unit 904 and the dictionary editor 903 directly operate a shared dictionary on a shared server via network connection. In this case, during editing annotations, it is necessary to always maintain the connection to the shared server.

According to another variation of this embodiment, electronic document editor 902 and the word processor (e.g. MSWORD etc.) that the author uses for composing and editing an electronic document are in a common system, or in other words, the word processing unit is integrated with the apparatus for editing annotations in an electronic document 900 of the present invention (e.g. in the form of a plug-in), and thus the editing of annotations can be performed during editing and composing an electronic document.

Figure 10:
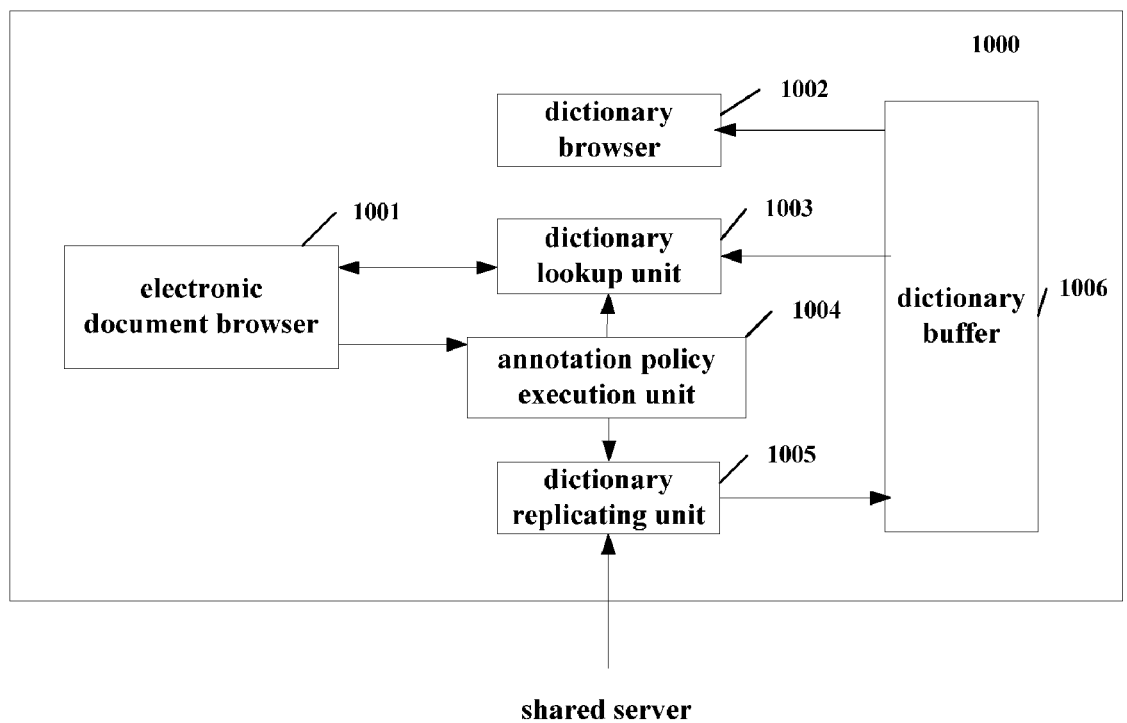
FIG. 10 is a block diagram illustrating an apparatus for browsing annotations in an electronic document according to an embodiment of the invention.

Under the same inventive concept, FIG. 10 is a block diagram showing an apparatus for browsing annotations in an electronic document according to an embodiment of the prevention. As shown in FIG. 10, the apparatus 1000 for browsing annotations in an electronic document of this embodiment comprises: a dictionary buffer 1006 for storing a shared dictionary locally; an electronic document browser 1001 for browsing an electronic document, such as selecting annotated portions in an electronic document and displaying an corresponding annotation content etc.; a dictionary lookup unit 1003 for looking up an annotation content corresponding to an annotated portion in a shared dictionary; an annotation policy execution unit 1004 for reading the annotation policy of an electronic document, and controlling dictionary lookup unit 1003 and dictionary replicating unit 1005 to use the shared dictionary of a version specified by the annotation policy; the dictionary replicating unit 1005 for replicating a shared dictionary on a shared server to dictionary buffer 1006; a dictionary browsing unit 1002 for browsing the content of the shared dictionary.

Through the apparatus 1000 for browsing annotations in an electronic document of this embodiment, the method for browsing an annotation as described in the previous embodiments can be implemented. Particularly, when a reader opens an electronic document to browse in the electronic document browser 1001, the annotation policy execution unit 1004 reads the annotation policy of this electronic document and transfers it to the dictionary replicating unit 1005. The dictionary replicating unit 1005 downloads, according to the annotation policy, the data of the shared dictionary from the shared server and restores the shared dictionary in dictionary buffer 1006, the specific process has been described above in conjunction with the embodiment in FIG. 8 and will not be repeated here. Next, when the reader performs annotation operations, such as selecting an annotated portion and requesting to display the annotation content, the dictionary lookup unit 1003 looks up, based the annotated portion (or the corresponding tag, if available), the corresponding annotation content (entry) in the shared dictionary of specified version in dictionary buffer 1006, and transfers the annotation content found to electronic document browser 1001 to present to the reader.

The apparatus for browsing annotations in an electronic document of this embodiment can be used to implement the variations of the previous methods, such as, for example, the variations that an electronic document relates to a plurality of shared dictionaries, that a shared dictionary has multiple versions, and that multiple serial versions of a shared dictionary are stored in incremental manner on the shared server.

Because dictionary buffer 1006 in this embodiment can be used to store the shared dictionary on the shared server locally, it is not necessary to maintain the connection to the shared server during browsing annotations, and because dictionary buffer 1006 is in local, the performance of looking up and editing has been enhanced.

Alternatively, according to a variation of this embodiment, in an apparatus for editing annotations in an electronic document 1000 there is no dictionary buffer 1006 and dictionary replicating unit 1005. Dictionary lookup unit 1003 and dictionary browser 1002 directly operate the shared dictionary on a shared server via network connection. In this case, during browsing annotations, it is necessary to always maintain the connection to the shared server.

According to another variation of this embodiment, electronic document browser 1001 and the browser (such as IE, Acrobat Reader etc.) that the author uses for browsing an electronic document are in a common system, or in other words, the electronic document browser is integrated with the apparatus 1000 for browsing annotations in an electronic document of the present invention (e.g. in the form of a plug-in), and thus browsing of annotations can be performed during browsing an electronic document.

Figure 2:
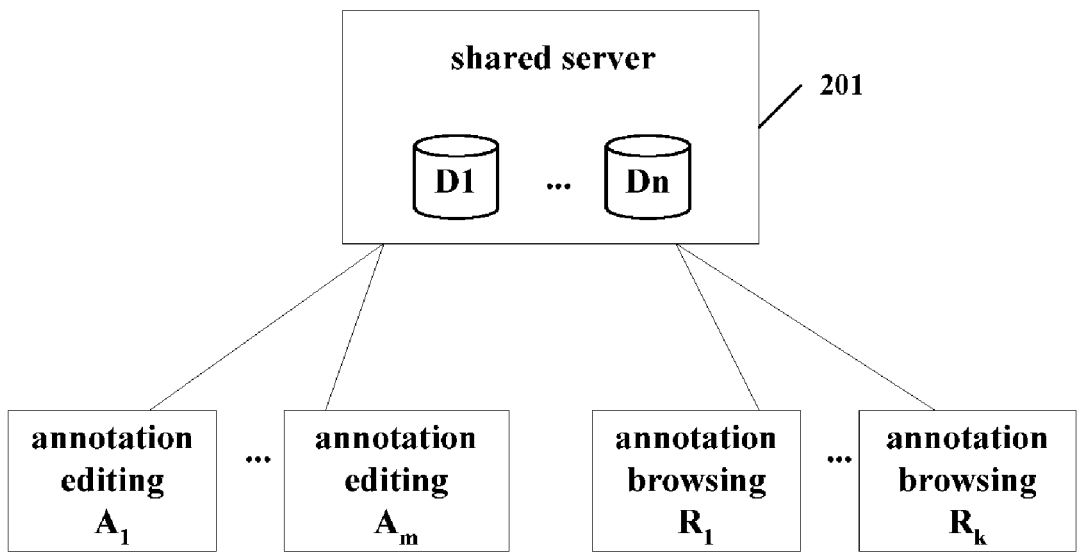
FIG. 2 is a schematic structural diagram illustrating a system of annotation for electronic documents according to an embodiment of the invention.

Under the same inventive concept, FIG. 2 is a schematic structural diagram of a system of annotation for electronic documents according to an embodiment of the present invention. As shown in FIG. 2, the system of annotation for electronic documents of this embodiment, comprises: a shared server 201 for storing shared dictionaries and providing access to the shared dictionaries stored thereon; annotation editing apparatus $A_1 \sim A_m$, namely the apparatus for editing annotations in an electronic document described above; annotation browsing apparatus $R_1 \sim R_k$, namely the apparatus for browsing annotations in an electronic document described above.

In this system of annotation for electronic documents, the annotation editing apparatus $A_1 \sim A_m$ implement the methods for creating and modifying an annotation in an electronic document, as described above, to edit annotations in an electronic document, and save the shared dictionary containing the annotation contents onto a shared server 201; the annotation browsing apparatus $R_i \sim R_k$ implement the methods for browsing an annotation in an electronic document, as described above, to present annotations in an electronic document to a reader according to the shared dictionary stored on the shared server 201.

Preferably, shared server 201 can perform access control management for the shared dictionaries stored thereon, for example, an author using an annotation editing apparatus has read and write access to the shared dictionary that he/she uses, while a reader only has read access.

Furthermore, and preferably, shared server 201 can have the capability for maintaining (managing) the versions of shared dictionaries, thereby the burden of the annotation editing apparatus and annotation browsing apparatus, as a client, can be mitigated. Such a shared server can use, for example, the system disclosed in the pending patent application titled "A method and system for distributing and updating varied and dispersed resources" (Chinese application No. 03131176.8, filed on May 16, 2003), the contents of which are entirely incorporated herein for reference.

The above-described apparatus for editing annotations, apparatus for browsing annotations and their respective components according to the present invention can be implemented in the form of hardware and software and can be combined with other apparatus as needed, and the apparatus for editing annotations and the apparatus for browsing annotations can also be implemented in the same computer.

While the method of annotation for electronic document, the method for creating an annotation in an electronic document, the method for modifying an annotation in an electronic document, the apparatus for editing annotations in an electronic document, the apparatus for browsing annotations in an electronic document and the system of annotation for electronic documents of the present invention, have been described above in detail through some exemplary embodiments, these embodiments are not exhaustive, and those skilled in the art can make various changes and modifications within the spirit and scope of the present invention. Therefore the present invention is not limited to these embodiments; the scope of the present invention is only defined by accompanying claims.

What is claimed is:

1. A method of annotation for electronic documents, comprising:
   storing annotation contents for one or more electronic documents in a shared dictionary; and
   providing a reader with annotations for the electronic document one of the one or more electronic documents based on the shared dictionary,
   wherein the annotations are provided in response to the reader browsing the electronic document, and
   wherein the shared dictionary includes a plurality of versions, and wherein the electronic document contains an annotation policy for specifying a version requirement of the shared dictionary to be utilized by the electronic document, and
   wherein the annotation policy comprises a restrict version, a non restrict, a version, an above version and a latest version.

2. The method of claim 1, wherein the electronic document relates to a plurality of shared dictionaries including different annotation contents respectively.

3. A method for creating an annotation in an electronic document, comprising:
- selecting a portion to be annotated in the electronic document;
- looking up a corresponding annotation content in a shared dictionary, wherein the shared dictionary contains annotation contents for one or more electronic documents;
- associating the portion to be annotated in the electronic document with the corresponding annotation content in the shared dictionary; and
- setting an annotation policy for the electronic document, wherein the annotation policy is used to specify a version requirement of the shared dictionary to be used by the electronic document, wherein the annotation policy comprises a restrict version, a non restrict version, an above version and a latest version.

4. The method of claim 3, further comprising adding an entry into the shared dictionary to input additional annotation content.

5. The method of claim 3, wherein the electronic document relates to a plurality of shared dictionaries, and the setting of the annotation policy comprises setting an annotation policy for each of the plurality of shared dictionaries.

6. A system tangibly embodied on a client-server network for editing annotations in an electronic document, comprising:
- an electronic document editor for browsing and editing an electronic document, and
selecting a portion to be annotated in the electronic document;
- a dictionary lookup unit for looking up content corresponding to the portion in the electronic document to be annotated, wherein the shared dictionary contains annotation contents for one or more electronic documents;
- a dictionary editor for adding to and modifying the annotation contents in the shared dictionary; and
- an annotation policy setting unit for setting an annotation policy for the electronic document, wherein the annotation policy comprises a restrict version, a non restrict version, an above version and a latest version.

7. The system of claim 6, further comprising a disambiguating unit for selecting one annotation content when the dictionary lookup unit finds more than one corresponding annotation contents in a plurality of shared dictionaries.

* * * * *